United States Patent Office 3,233,928
Patented Feb. 8, 1966

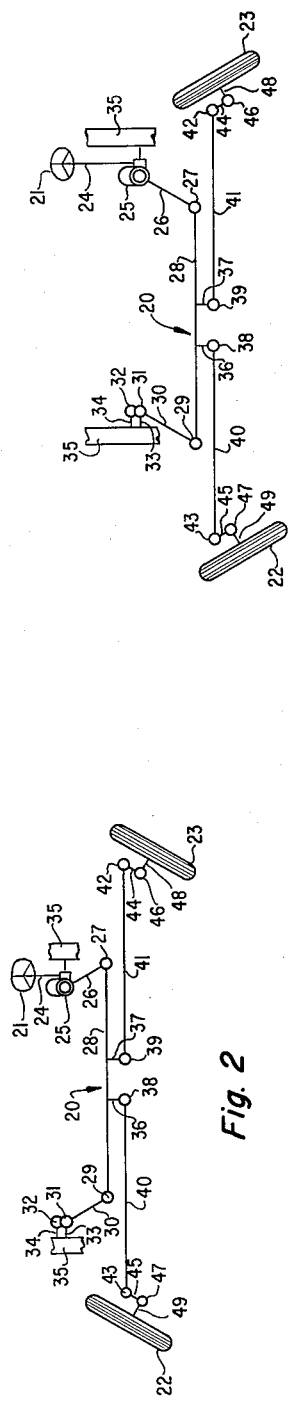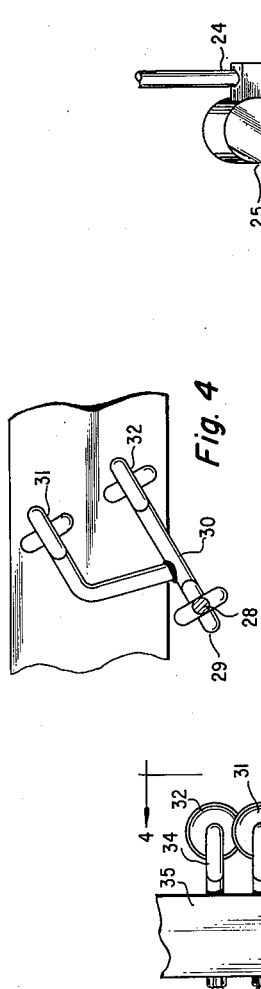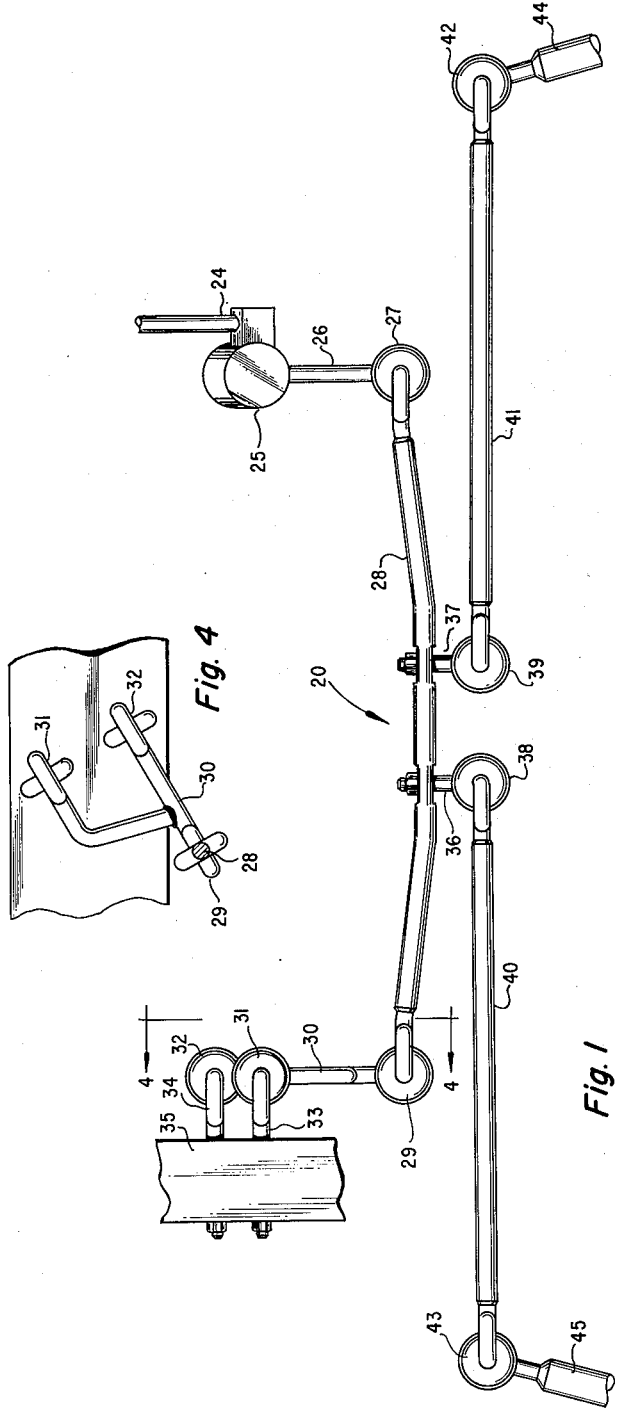

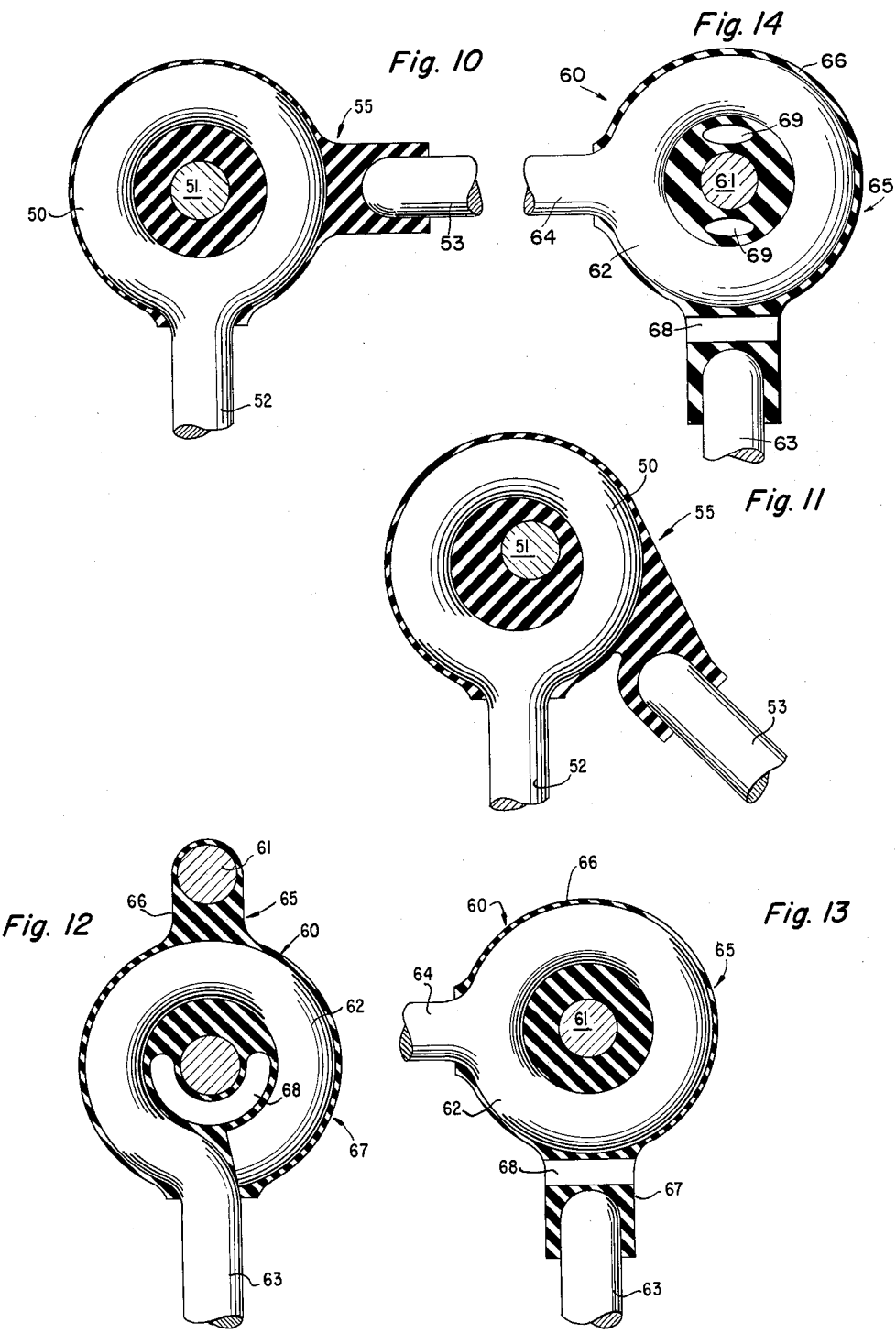

3,233,928
MECHANICAL LINKAGE JOINT
Vasalie L. Peickii, Hillsborough, Dan A. Christensen, Woodside, and John H. Bradfute, Santa Clara, Calif., assignors to Federal-Mogul Corporation, a corporation of Michigan
Filed Dec. 9, 1963, Ser. No. 330,518
4 Claims. (Cl. 287—85)

This invention relates to a mechanical linkage joint of the type which has two pieces that swing relatively to each other. This application is a continuation-in-part of application Serial No. 189,613, filed April 23, 1962, and now abandoned.

In contrast to the types of ball joints and hinges in which metal members directly engage each other and rotate relatively to each other, the present invention relates to a novel type of linkage in which a pair of metal loops are joined together by an elastomeric connector which is bonded to both of the loops. Typical types of assemblies where the invention may be used to include steering gear linkages, universal joints, wheel suspensions, shock absorber arms, and many other places where ball joints and hinges have been used.

Considering as an example the use of the invention in automotive steering rod linkages, it is known that each steering linkage system for the front wheels of an automobile requires several ball joints and that such joints are relatively expensive and usually require maintenance lubrication. The present invention makes it possible to provide a much less expensive type of linkage at each joint with even superior results. Thus, one object of the invention is to provide a simpler and more reliable connection which has no maintenance requirements over a long useful life.

The ball joint of this invention has substantially all of the advantages of a ball joint but in addition it is simpler, requires no maintenance, damps shock and vibration and so transfers less of them from one rod to another, and is free from the possibility of wear which results from sliding contact. In many applications the joint of this invention has a much longer life than joints heretofore in use. Furthermore, the joints in fail-safe in that if the elastomer should fail completely, the interlocking metal loops could still not come apart.

When used in steering linkage, the invention provides flex joints that reduce the road and front wheel noise and vibration transmitted through the steering linkage, giving a quieter ride and a more solid sounding car. The joints have an inherent centering force and lack of friction, enabling alteration of the front-end geometry so as to lower the steering wheel rim force. Since the joints have no clearance between their moving parts, they have no free play at any time, in contrast to conventional joints in which the free play increases with wear; the joints of this invention have no wearing surfaces and remain tight during their entire service life.

Moreover, shock loads such as are caused when a front wheel drops in a chuck hole in a road have heretofore been transmitted to the steering gear box undiminished by a conventional linkage; whereas, in the present invention, the shock is dampened by each joint, and each joint through which the shock passes reduces the severity of the shock.

In the joint of this invention there are no wearing surfaces, so that the joint life can be made to equal the car life. No lubrication is needed, and maintenance is eliminated. Moreover, not only are the joints in themselves less expensive than conventional joints, but due to their lasting as long as the car, it is not necessary to make concessions to ease of replacement of them, and the tie rod joints can be made integral with the steering arm, for example.

When the joint of this invention is used in other applications, similar advantages obtain, as well as additional ones specific to the particular application.

Other objects and advantages of the invention will appear from the following description of some embodiments thereof.

In the drawings:

FIG. 1 is a plan view of a portion of an automobile steering linkage employing joints embodying the principles of the present invention.

FIG. 2 is a diagrammatic plan view showing a steering linkage like that of FIG. 1 when a right turn is being made by the vehicle.

FIG. 3 is a view similar to FIG. 2 showing the position of the elements in the linkage when a left turn is being made by the vehicle.

FIG. 4 is a fragmentary view in section, taken along the line 4—4 of FIG. 1.

FIG. 10 is a similar view taken along the line 10—10 in FIG. 8.

FIG. 11 is a view similar to FIG. 10 showing the two rods moved relatively to each other as they are during a turn, and showing somewhat the position taken by the eyes and the elastomer during this time.

FIG. 12 is a view similar o FIG. 9 of a modified form of the invention.

FIG. 13 is a view similar to FIG. 10 of the modified form of the invention as shown in FIG. 12.

FIG. 14 is a view similar to FIG. 13 of a further modified form of the invention.

Figure 5:
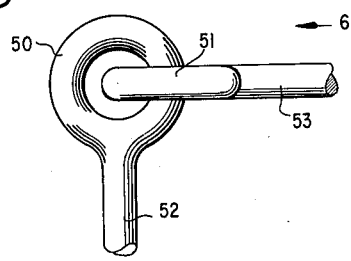
FIG. 5 is a fragmentary plan view of two metal eyes of the type used in the linkage, prior to the incorporation of the elastomer, showing two interlocked metal eyes with their rods being broken to conserve space.
Figure 6:
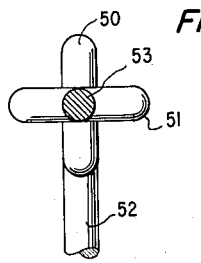
FIG. 6 is a view taken at right angles to FIG. 5, looking in the direction of the arrow 6 in FIG. 5.
Figure 7:
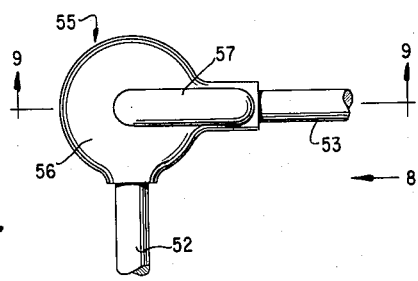
FIG. 7 is a view similar to FIG. 5 of the completed joint with the elastomer bonded to the two metal rings.
Figure 8:
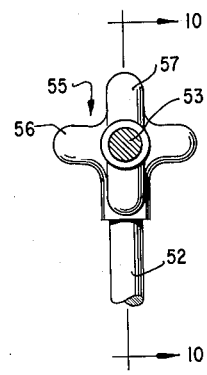
FIG. 8 is a view in side elevation, looking in the direction of the arrow 8 in FIG. 7.

In order to illustrate the utility of the invention and to give some idea of its purpose and function, FIGS. 1 to 4 show a portion of the steering linkage at the front end of an automobile. Thus, the linkage 20 transmits the turning from a steering wheel 21 to front wheels 22 and 23. A rod 24 connects the steering wheel 21 to a gear box 25 from which a rod 26 passes to a joint 27 of the present invention. From the joint 27, a rod 28 extends across to the opposite side of the automobile to a similar joint 29, whence a clevised rod 30 is connected to a pair of such joints 31 and 32, and rods 33 and 34 lead from the joints 31 and 32 to a frame 35. The gear box 25 is bolted to the frame 35. Near its center, the rod 28 is connected to short rod members 36 and 37 that are respectively joined to joints 38 and 39 of this invention;

the joints 38 and 39 are connected by respective rods 40 and 41 to joints 42 and 43, which in turn are connected by rods 44 and 45 to members 46 and 47 that support spindles 48 and 49 for the wheels 22 and 23. Each one of the joints 27, 29, 31, 32, 38, 39, 42, and 43 is shown as one that embodies the present invention. It will be noted that the two rods which lead to or from any joint may take various positions as shown by FIGS. 2 and 3 and may or may not lie in the same plane.

Figure 9:
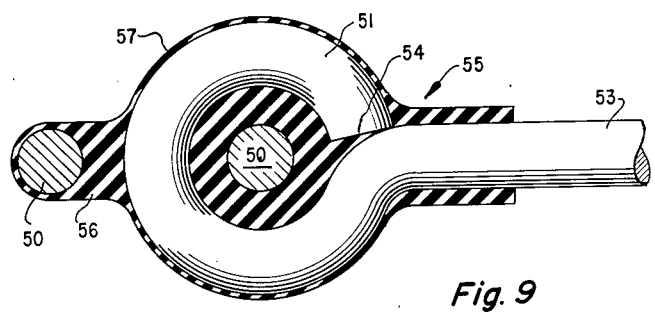
FIG. 9 is an enlarged view in section taken along the line 9—9 of FIG. 7.

Each joint 27, 29, 31, 32, 38, 39, 42 and 43 is made up (see FIGS. 5–11) of two loops or eyes 50, 51 each forming the end of a metal rod 52, 53 or having a stem which is threaded to the end of a rod, either in the plane of the loop or not. One loop 50 may be a completely closed circle forged for that purpose, while the other loop 51 may be inserted and closed around it and may be closed completely by welding, or may be left as shown in FIG. 9 with the looped end 54 of the rod flush against the stem 53. In either instance, the device is fail-safe, due to the interlocking of the two loops 50 and 51.

The two stems 52 and 53 may be held in any relative position desired during molding. For convenience, FIGS. 5–10 show them held in the position where they are perpendicular to each other, but they could be held at an angle such as that shown on the joints 42 and 43 in FIG. 1, and molded at rest in that position, or they may be molded perpendicular and the joint stressed to that position, whichever gives the most desirable results for a particular instance. The adaptability of the invention in this particular is quite great, enabling the rest position to be determined at the time of molding. The option of stressing the joints on assembly allows the engineer designing a linkage system to vary the turning force of the steering wheel at any position of the linkage.

An elastomer is used to fill the joint in the manner shown in FIGS. 7 through 10. Thus, when seen in the view of FIGS. 9 and 10, it will be seen that the elastomer member 55 is one integral member bonded to both loops 50 and 51, having two planar portions 56 and 57 that lie along the plane of respective eyes 50, 51 filling both eyes 50 and 51 and joining each eye to its adjacent eye. Thus, the member 55 is shaped generally like two intersecting discs 56, 57 filling the space enclosed by the eyes 50 and 51 and also covering and bonded to the metal of the eyes 50, 51.

Any elastomer suitable for the use involved is satisfactory, the necessary strength and flexibility being provided by proper choice of polymer and by compounding procedures well known in the art.

When one rod 52 is moved relatively to the other rod 53 to flex the joints, as shown in the diagrammatic representation in FIGS. 2 and 3, an action takes place somewhat like that shown in FIG. 11 which, however, may be somewhat exaggerated as to some of the forms, especially for rather short turns; in any event, the elastomer is deformed, setting up stresses as it moves into the shape shown. Thus, the one loop 51 has moved closer to the other loop 50 during the turn with a force tending to return it to the original position, both by the tensile force and the compressive force exerted on the elastomer 55.

Thus, the action of the joint of this invention is different than that of a normal hinge or a metal joint of this type in that there is no stressless pivoting, but instead, the members are turned in a way which sets up stress. They are held together without having to be concerned with fits, finish, lubrication and so on, all these being taken care of by the inherent properties of the elastomer 55.

An important feature of the invention is the fact that the loops can rotate about the center of the joint against relatively light force in the elastomer, but the loops are restrained from relative translation by considerably greater elastomeric force. The reason is that elastomers have a much lower shear modulus than tensile modulus for any given elongation. In other words, the elastomer is soft in shear but stiff in tension and compression. This helps to retain proper alignment during operation.

In any particular installation, one loop of the double-loop joint is loaded torsionally and the other loop is loaded as a diagram. Since the diaphragm has essentially tensile loading, it is possible to remove certain portions of the elastomer from the diaphragm loop and thereby to reduce the rotary stiffness of the joint by a substantial amount. As shown in FIGS. 12 and 13, it is sometimes advisable to remove a portion of the elastomer or to so mold it that it is not present in order to reduce some of the effects noted in the form of the invention previously described. Thus, the joint 60 of FIGS. 12 and 13 has eyes 61 and 62, rods 63 and 64, and elastomer 65 with disc portions 66 and 67, the portion 67 having an opening 68 which shows in FIG. 12 as a semi-circular arc and shows in FIG. 13 as a through opening. This means that when the rod 64 is flexed relatively to the rod 63, the elastomer body 65 deforms differently, occasioning less stress and less restorative force than does the solid elastomer body 55.

In some instances it is advisable to employ the structure shown in FIG. 14, where openings 69 extend through the body 65 along the axis of the rod 63 on both sides of the eye 61. The openings 69 are diametrically opposite and are symmetrical to a diameter that lies perpendicular to the axis of the rod 64. These openings further reduce the force required to rotate the rods 63 and 64 about the center of the joint 60 while effecting only a relatively slight loss in stiffness so far as tension and compression are concerned.

To those skilled in the art to which this invention relates, many additional changes in construction and widely differing embodiments of the invention will suggest themselves without departing from the spirit and scope of the invention as defined in the claims.

What is claimed is:

1. A joint comprising a pair of rods, each having a loop on one end, the said loops being interlocked, an elastomeric body encircling and passing within said loops and interposed between them and molded and bonded to both said loops in two intersecting disc-like portions each in the plane of a said loop, the portion of said body between one said loop and its rod having a large opening through said body, there also being openings on both sides of the diametrically opposite sides of said loop and the other said loop axially in line with the rod adjacent said large opening, whereby said rods can rotate about said joint against relatively light force in the elastomer but are restrained from translation of the two rods relative to each other by considerably greater elastomeric force.

2. A joint between two relatively rotatable rods comprising a ring on the end of each rod with the ring of one rod being interlocked with the ring of the other rod and the plane of the ring of one rod being perpendicular to the plane of the ring of the other rod, and an elastomeric body bonded to both rings and encircling and passing within both rings and interposed between them and having two disc-like portions each lying in the plane of one ring and intersecting each other, one said disc-like portion having an opening in the plane of its coplanar eye between its eye and the interlocked portion of the other eye and between said other eye and the rod of said coplanar eye.

3. The joint of claim 2 wherein the other said disc-like portion has diametrically opposite openings in the plane of its coplanar eye portion, said openings being symmetrical about a diameter lying perpendicular to the rod for that said eye portion.

4. A joint between two relatively rotatable rods comprising a ring on the end of each rod with the ring of one rod being interlocked with the ring of the other rod and the plane of the ring of one rod being perpendicular to the plane of the ring of the other rod, and an elastomeric body bonded to both rings and encircling and passing within both rings and interposed between them and having two disc-like portions each lying in the plane of one ring and intersecting each other, one said disc-like portion having diametrically opposite openings in the plane of its coplanar eye portion on opposite sides of one segment of the other eye portion, said openings being symmetrical with respect to a diameter lying perpendicular to the rod for the said coplanar eye portion.

References Cited by the Examiner

UNITED STATES PATENTS 2,095,416  10/1937  Lefevre _____ 285—85 X

FOREIGN PATENTS 428,511  12/1947  Italy.

CARL W. TOMLIN, *Primary Examiner.*

THOMAS F. CALLAGHAN, *Examiner.*

UNITED STATES PATENT OFFICE
CERTIFICATE OF CORRECTION

Patent No. 3,233,928            February 8, 1966

Vasalie L. Peickii et al.

It is hereby certified that error appears in the above numbered patent requiring correction and that the said Letters Patent should read as corrected below.

Column 1, line 22, strike out "to"; line 37, strike out "ball"; same column 1, line 44, for "joints in" read -- joint is --; column 2, line 46, for "o" read -- to --; column 4, lin 5, for "diagram" read -- diaphragm --.

Signed and sealed this 10th day of January 1967.

(SEAL)
Attest:

ERNEST W. SWIDER
Attesting Officer

EDWARD J. BRENNER
Commissioner of Patents